United States Patent
Kanematsu et al.

(10) Patent No.: US 7,219,972 B2
(45) Date of Patent: May 22, 2007

(54) PRINT APPARATUS, METHOD OF CONTROLLING SAME AND THEREFOR

(75) Inventors: Daigoro Kanematsu, Yokohama (JP); Mitsutoshi Nagamura, Ohta-Ku (JP); Naoko Baba, Kawasaki (JP); Tomomi Furuichi, Yokohama (JP); Kazuo Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 11/066,216

(22) Filed: Feb. 28, 2005

(65) Prior Publication Data

US 2005/0195230 A1     Sep. 8, 2005

(30) Foreign Application Priority Data

Mar. 1, 2004   (JP)   ............................. 2004-056660

(51) Int. Cl.
*B41J 29/38*   (2006.01)
*B41J 29/393*  (2006.01)

(52) U.S. Cl. .............................. 347/14; 347/17; 347/19

(58) Field of Classification Search ..................... None
See application file for complete search history.

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,608,577 A | 8/1986 | Hori | 346/140 |
| 4,723,129 A | 2/1988 | Endo et al. | 346/1.1 |
| 4,740,796 A | 4/1988 | Endo et al. | 346/1.1 |
| 6,517,175 B2 * | 2/2003 | Kanaya et al. | 347/7 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |

* cited by examiner

*Primary Examiner*—Thinh Nguyen
(74) *Attorney, Agent, or Firm*—Fitzpatrick, Cella, Harper & Scinto

(57) ABSTRACT

Disclosed is an inkjet print apparatus in which a printhead capable of printing utilizing ink of at least one color is mounted on a carriage and the carriage is caused to move across a printing medium to print an image on the printing medium, comprising: a head temperature detector for detecting temperature of the printhead; a dot counter for counting number of dots, which are formed in divided areas, per each divided area obtained by dividing an area of the printing medium into a plurality of areas in prescribed units; a comparator for comparing a threshold value, which corresponds to printhead temperature information that has been detected by the head temperature detector, and a count value representing the number of dots counted by the dot counter; and a decision unit for deciding, based upon result of the comparison performed by the comparator, a drive frequency for driving the printhead and a moving speed of the carriage; wherein printing of an image on the printing medium is performed at the drive frequency and moving speed decided by the decision unit.

11 Claims, 13 Drawing Sheets

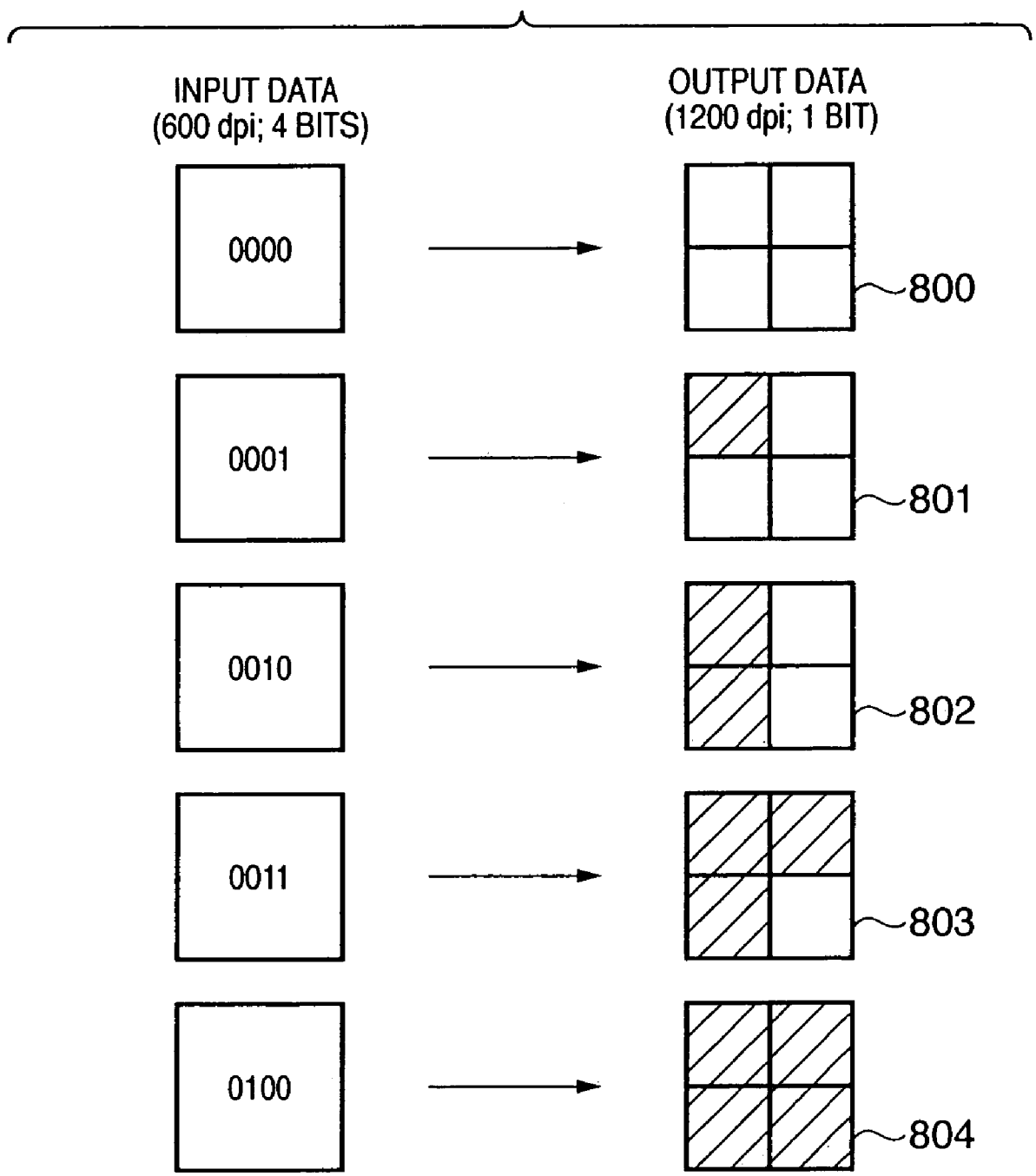
F I G. 4

PRINT APPARATUS, METHOD OF CONTROLLING SAME AND THEREFOR

FIELD OF THE INVENTION

This invention relates to an inkjet print apparatus for moving an inkjet printhead and a printing medium relative to each other to print an image on the printing medium.

BACKGROUND OF THE INVENTION

In an inkjet print apparatus equipped with a serial-type inkjet printhead, the inkjet printhead is caused to scan in a primary scan direction and the printhead is driven in sync with the scanning thereof based upon a head drive signal obtained from image data to thereby discharge ink from the printhead nozzles and form an image on the printing medium, such as printing paper.

The inkjet head used in such an inkjet print apparatus will be described. Printing methods that are available for use with an inkjet printer include a method that utilizes electro-thermal transducers (heaters), and another that utilizes piezoelectric elements, as discharge-energy generating elements that apply discharge energy for discharging ink droplets.

Both methods make it possible to discharge ink by applying electric signals to the discharge-energy generating elements. The former is advantageous in that little space is required for arraying the heaters constituted by the discharge-energy generating elements, the inkjet head is simple in structure and is capable of being made small in size, and a higher density can be achieved comparatively easily. A drawback, however, is that the heat produced by the heaters accumulates inside the head.

Accordingly, when printing is performed continuously at a high duty, the volume of the discharged ink droplets increases owing to a rise in the temperature of the head, refilling of the ink is not performed soon enough and discharge failure such as deviation from a normal direction or insufficient amount of ink occur.

A method that has been disclosed in order to solve this problem is to acquire printhead temperature information at a prescribed timing and lower the drive frequency of the printhead if the acquired temperature is greater than a predetermined temperature.

With the method described above, however, the amount of increase in printhead temperature subsequent to the prescribed timing cannot be estimated. For this reason, a value that attempts to take into account the maximum rise in temperature recorded after the prescribed timing is set as a threshold temperature. In this case, the threshold temperature is set low to an extent that takes the temperature rise into consideration. However, the actual rise in temperature depends upon printing duty subsequent to the prescribed timing. Consequently, even in a case where printing duty following the prescribed timing is low and a rise in temperature of the expected level does not occur, the drive frequency declines and, as a result, it is difficult to hold the decline in printing speed to the minimum.

Thus, in the prior art, it is difficult to minimize a decline in throughput while suppressing ink discharge failure due to a rise in temperature at the time of continuous printing.

SUMMARY OF THE INVENTION

Accordingly, in view of the circumstances set forth in the examples of the prior art above, the present invention provides an inkjet print apparatus in which a printhead capable of printing utilizing ink of at least one color is mounted on a carriage and the carriage is caused to move across a printing medium to print an image on the printing medium, comprising: head temperature detecting means for detecting temperature of the printhead; dot counting means for counting number of dots, which are formed in divided areas, per each divided area obtained by dividing an area of the printing medium into a plurality of areas in prescribed units; comparing means for comparing a threshold value, which corresponds to printhead temperature information that has been detected by the head temperature detecting means, and a count value representing the number of dots counted by the dot counting means; and deciding means for deciding, based upon result of the comparison performed by the comparing means, a drive frequency for driving the printhead and a moving speed of the carriage; wherein printing of an image on the printing medium is performed at the drive frequency and moving speed decided by the deciding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 4 is a diagram useful in describing index expansion corresponding to an embodiment of the present invention;

DETAILED DESCRIPTION OF THE PREFERRED EMBODIMENTS

Preferred embodiments of the present invention will now be described in detail in accordance with the accompanying drawings.

[First Embodiment]

A first embodiment of the present invention will be described in detail with reference to the drawings.

Figure 1:
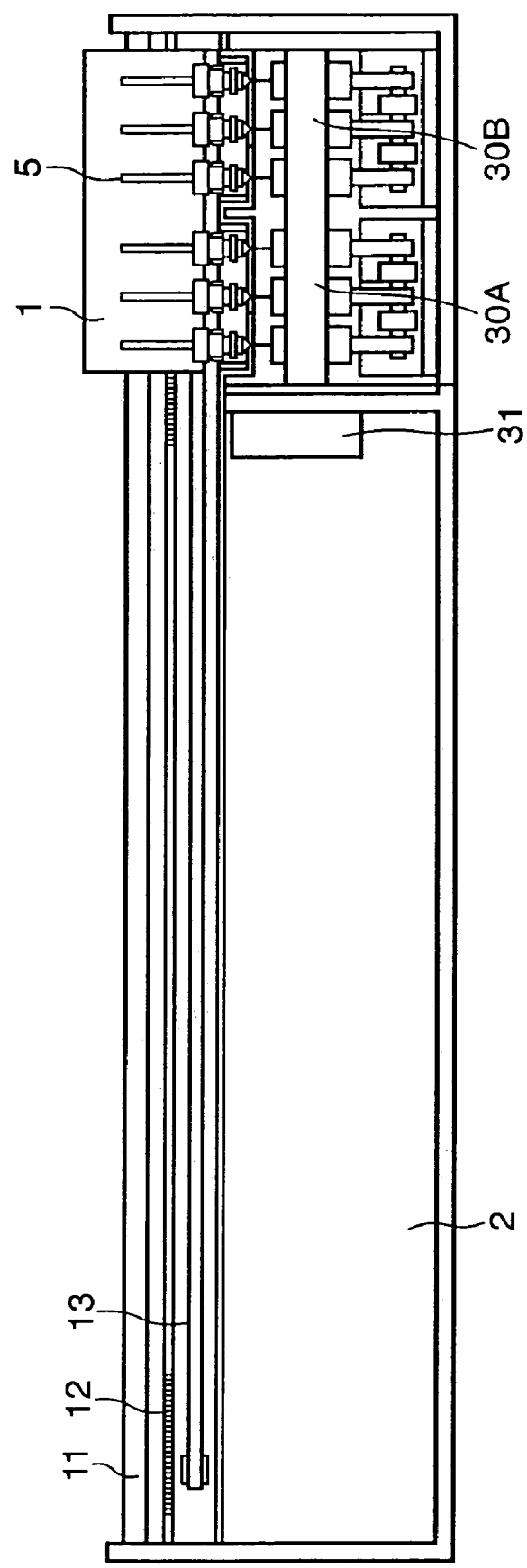
FIG. 1 is a diagram illustrating one example of the structure of an inkjet print apparatus that corresponds to an embodiment of the present invention.

FIG. 1 is a top view illustrating an inkjet print apparatus according to one embodiment of the present invention. As shown in FIG. 1, the apparatus has a main body 2 that includes a paper transport unit. A carriage 1, on which six printheads 5 are mounted, is moved so that the printheads 5 can be made to scan across the printing medium. The printheads 5 have a temperature sensor for sensing head temperature.

The carriage 1 is guided and supported by a guide shaft 11 so as to be movable therealong. The carriage 1 can be moved back and forth by a driving force transmitted via a belt 13. The inks used are of a total of six colors. Besides cyan (C), magenta (M), yellow (Y) and black (K), light cyan (LC) and light magenta (LM), which are for the purpose of reducing graininess, are used.

In the case of FIG. 1, it is described that inks of six colors are used. However, it will suffice if an inkjet print apparatus applicable to the present invention is one that uses ink of at least one color. In case of a monochrome print apparatus, for example, it will suffice if just black (K) ink is used. In case of a color print apparatus, the four colors of cyan (C), magenta (M), yellow (Y) and black (K) can be used.

Recovery mechanisms 30A, 30B include a wiping mechanism (not shown), which is equipped with a cap, for performing a suction operation using a pump (not shown) of each printhead 5 as a driving source, and for wiping the discharge-port surfaces of the printheads 5 and protecting the printhead when the printhead is not in use. Reference numeral 31 denotes a preliminary-discharge ink receptacle for receiving ink discharged by preliminary discharge by each printhead 5.

When print data is received from a host apparatus in the apparatus described above, the carriage 1 is controlled so as to be moved along the guide shaft 11 (in the primary scan direction) in order that printing will be performed on a printing medium fed by a paper transport unit (not shown). As a result, each printhead 5 is scanned across the printing medium so that one band of an image is printed on the printing medium. The printing medium is transported by an amount equivalent to one band by the paper transport unit in a direction (secondary scan direction) perpendicular to the carriage 1. An encoder film 12 for detecting the position to which the carriage has been moved is disposed along the path of move of the carriage 1. An encoder sensor mounted on the carriage 1 makes it possible to ascertain the position of the carriage based upon a signal that is output from the sensor. Control is exercised based upon detection of position by the encoder in such a manner that the carriage 1 is moved to a home position (a position opposing the recovery mechanism).

Each printhead 5 is provided with 1280 discharge ports arrayed at a density of 1200 dpi (dots per inch) in the secondary scan direction. An ink passageway communicating with each discharge port is provided with an electrothermal transducer for locally heating the ink and inducing film boiling so that the ink is discharged by the pressured produced.

Figure 2:
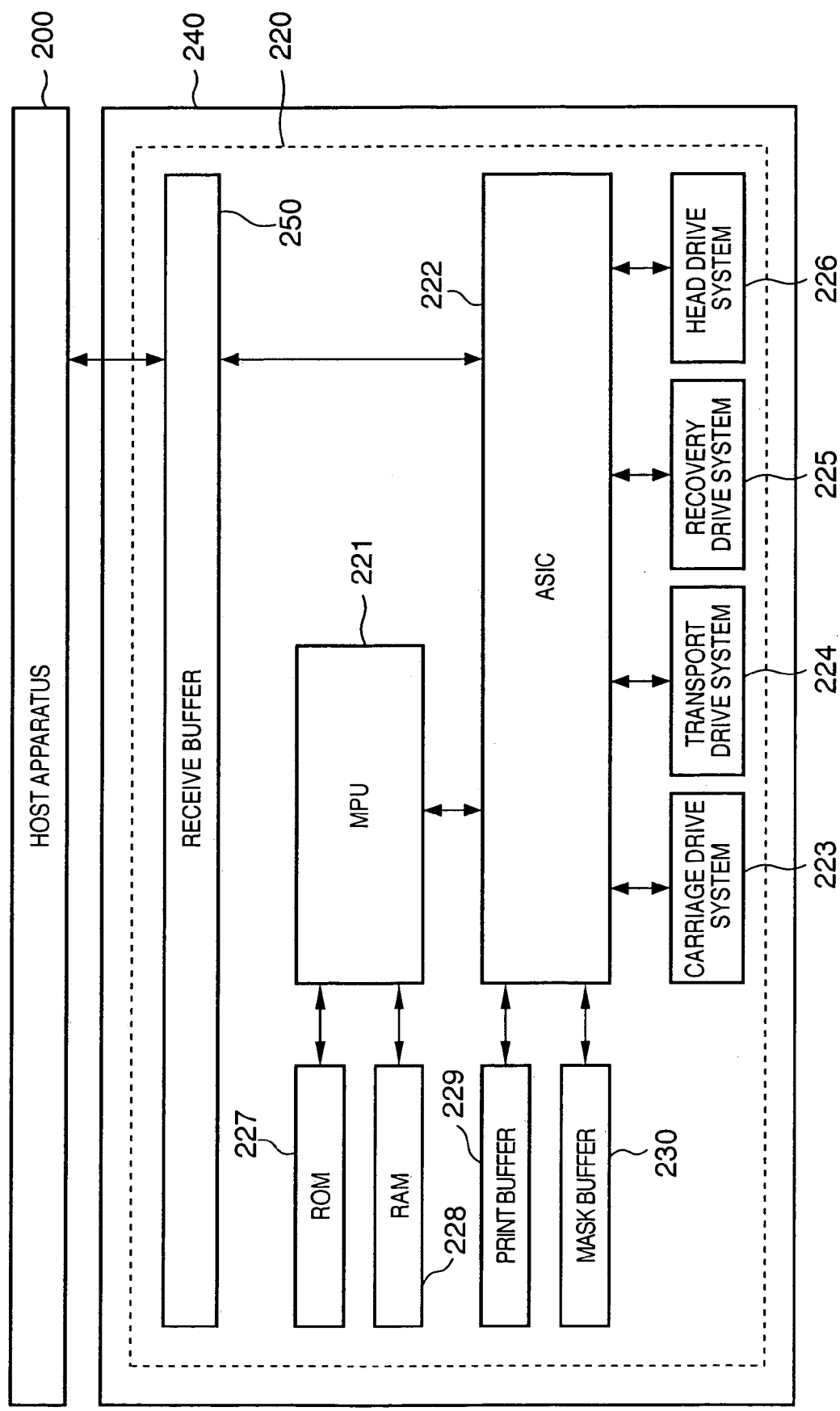
FIG. 2 is a block diagram illustrating an example of the structure of a control system of an inkjet print apparatus corresponding to an embodiment of the present invention.

FIG. 2 is a block diagram illustrating an example of the structure of a control system of the inkjet print apparatus shown in FIG. 1.

A print engine 220 is controlled by an MPU (microprocessing unit) 221 in accordance with a program stored in a ROM 227. A RAM 228 is utilized as a work area of the MPU 221 and as an area for saving data temporarily. The MPU 221 controls a carriage drive system 223, a transport drive system 224, a recovery drive system 225 and a head drive system 226. Further, the MPU 221 is adapted so as to be capable of reading from and writing to a read/write-capable print buffer 229 and mask buffer 230 from an ASIC (Application-Specific Integrated Circuit) 222.

The print buffer 229 temporarily archives image data that has been converted to a format in which it can be transferred to the printheads 5. The mask buffer 230 temporarily holds a prescribed mask pattern subjected to an AND (logical product) operation as necessary with respect to data transferred from the print buffer 229 when the image data is transferred to the printheads 5. A plurality of sets of mask patterns for multipass printing of different numbers of passes are provided within the ROM 227. When printing is actually performed, the applicable mask pattern is read out of the ROM 227 and stored in the mask buffer 230. The arrangement is such that the AND operation with respect to the print buffer 229 is not executed in a case where it is not necessary, as when single-pass printing is performed.

A printing operation will now be described with reference to FIG. 2.

Printing is started in response to transmission of image data from a host apparatus 200 to a receive buffer 250 of the print engine 220 within an inkjet print apparatus 240. The print engine 220 analyzes the image data received from the host apparatus 200 and generates information necessary for printing, such as print data, printing quality and margin information. At this time the information such as the print data, printing quality, media and margins is processed by the MPU 221 via the ASIC 222 and held in the RAM 228. This information is subsequently referred to as necessary and utilized in allocation of processing. Furthermore, a mask pattern is written to the mask buffer 230.

The print data is written to the print buffer 229, in a form in which it can be transferred to the printhead 5, by executing row-column conversion processing. At a stage at which data held in the print buffer 229 has accumulated to an amount at which a band of data can actually be printed, the MPU 221 operates such that the printing medium is transported by the transport drive system 224 via the ASIC 222 and the carriage 1 is moved by the carriage drive system 223. Further, the recovery system is driven by the recovery drive system 225 to perform the necessary recovery operation before the printing operation. Furthermore, the setting of an image output position, etc., is performed with respect to the ASIC 222 and the carriage 1 is driven to start the printing operation. When the carriage 1 moves and reaches a printing start position that has been set in the ASIC 222, the image data is read out of the print buffer 229 successively in conformity with the discharge timing.

At the same time, the corresponding mask pattern is read out of the mask buffer 230, and an AND operation is performed between the read image data and the mask data. If the image data is in an index format, the AND operation is performed at the resolution prevailing prior to the expansion of the index. Accordingly, printing is turned on and off in matrix units after expansion of the index. While the data resulting from the AND operation undergoes index expansion in real time via the ASIC 222, the binary data is transferred to the printhead 5. The printhead 5 is driven and discharges ink in accordance with the transferred data under the control of the head drive system 226. Printing is achieved by repeating the processing from receipt of the image from the host apparatus 200 up to the present.

Figure 3:
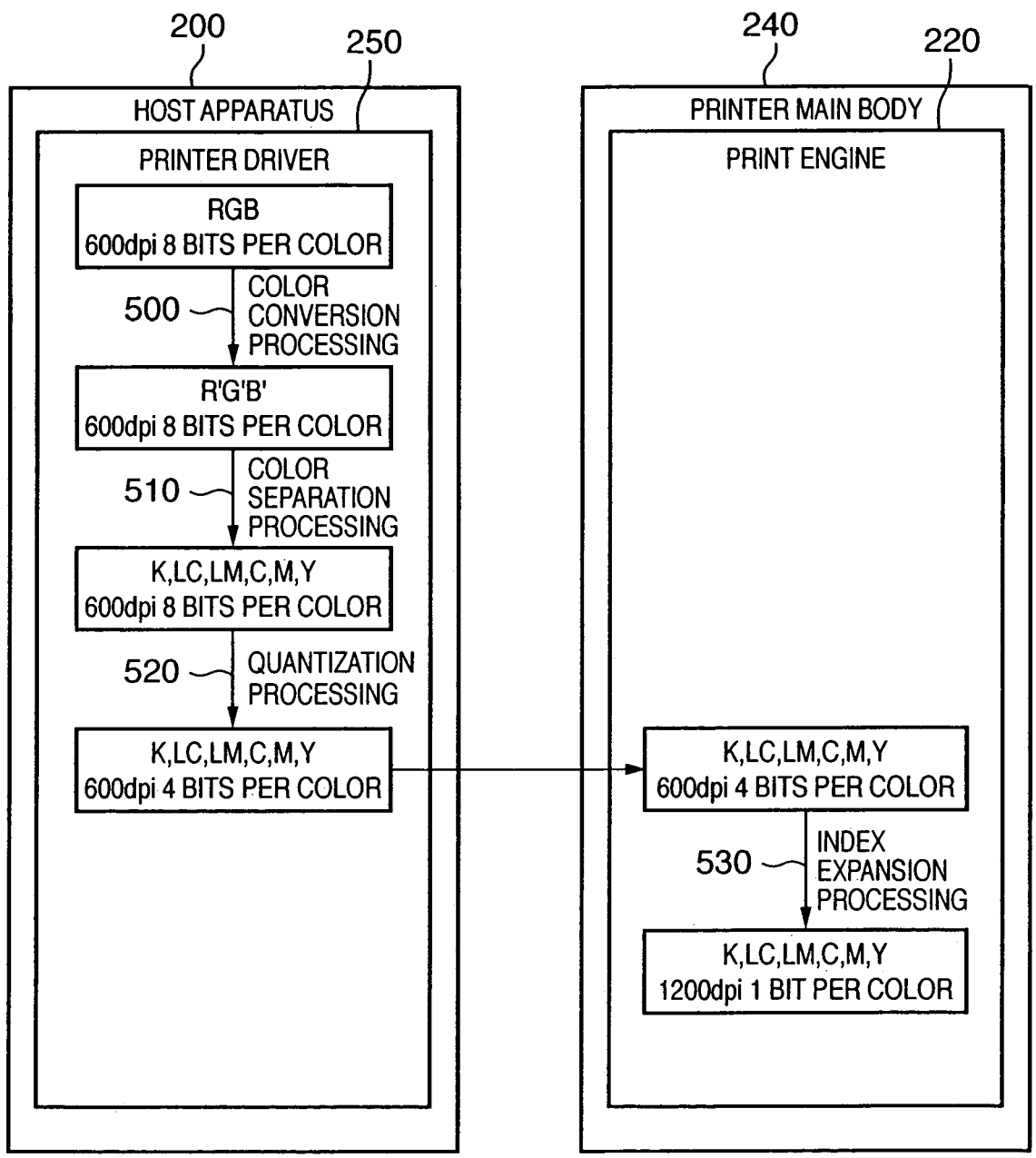
FIG. 3 is a diagram useful in describing the flow of data processing corresponding to an embodiment of the present invention.

FIG. 3 is a diagram for describing data processing executed in the host apparatus 200 and printer main body 240.

The host apparatus 200 generates 600×600 dpi RGB (red, green blue)-format multivalued data (eight bits per color) via a printer driver 250. Next, processing 500 for color conversion from RGB to R'G'B' is executed in order to obtain a color space that matches that of the printer. Next, processing 510 for color separation from the R'G'B 8-bit data to 600×600-dpi K, LC, LM, C, M, Y multivalued data (here eight bits per color) is executed in order to achieve conformity with the number of ink colors used by the printer. In the color conversion processing 500 and color separation processing 510, a color conversion is performed using a predetermined look-up table for color conversion.

Next, quantization processing 520 is executed for quantization from K, LC, LM, C, M, Y 8-bit (255-tone) data to four bits (five tones) for each color. The well-known error diffusion method or dither method is used to perform the quantization processing 520. After information necessary for printing, such as printing quality, media and margins, is added to the quantized K, LC, LM, C, M, Y 4-bit (5-tone) data, the data is transferred to the printer main body 240. The printer main body 240 performs printing while subjecting the received 4-bit data of each color to mask processing and index expansion processing 530 if necessary.

FIG. 4 is a diagram useful in describing index expansion. In general, index expansion is performed for the twin purposes of speed and quality by reducing the load of processing RGB multivalued data and improving tonality. In this embodiment, the printer main body 240 index-expands data in pixel units represented by four bits (five tones) at 600 dpi to 1200-dpi 1-bit (2-tone) data. Accordingly, the matrix size expanded is 2 (horizontally)×2 (vertically). As illustrated in FIG. 4, patterns (800, 801, 803, 804) to be expanded have been set previously for 4-bit data ("0000", "0001", "0010", "0011", "0100") of five tones, and therefore each pixel is printed by any of bits 0 to 4. These set patterns may be placed in a ROM within the printer main body beforehand or downloaded from the host apparatus together with print data. The above-mentioned 5-tone data is sent from the printer driver 250, the 600-dpi 4-bit data is expanded in pixel units based upon the set pattern of each tone level, and 1200-dpi 1-bit (2-tone) data is generated. By discharging ink from the printhead based upon this 1-bit (2-tone) data, dots corresponding to the image to be formed are placed in the printing area of the printing medium.

Figure 5:
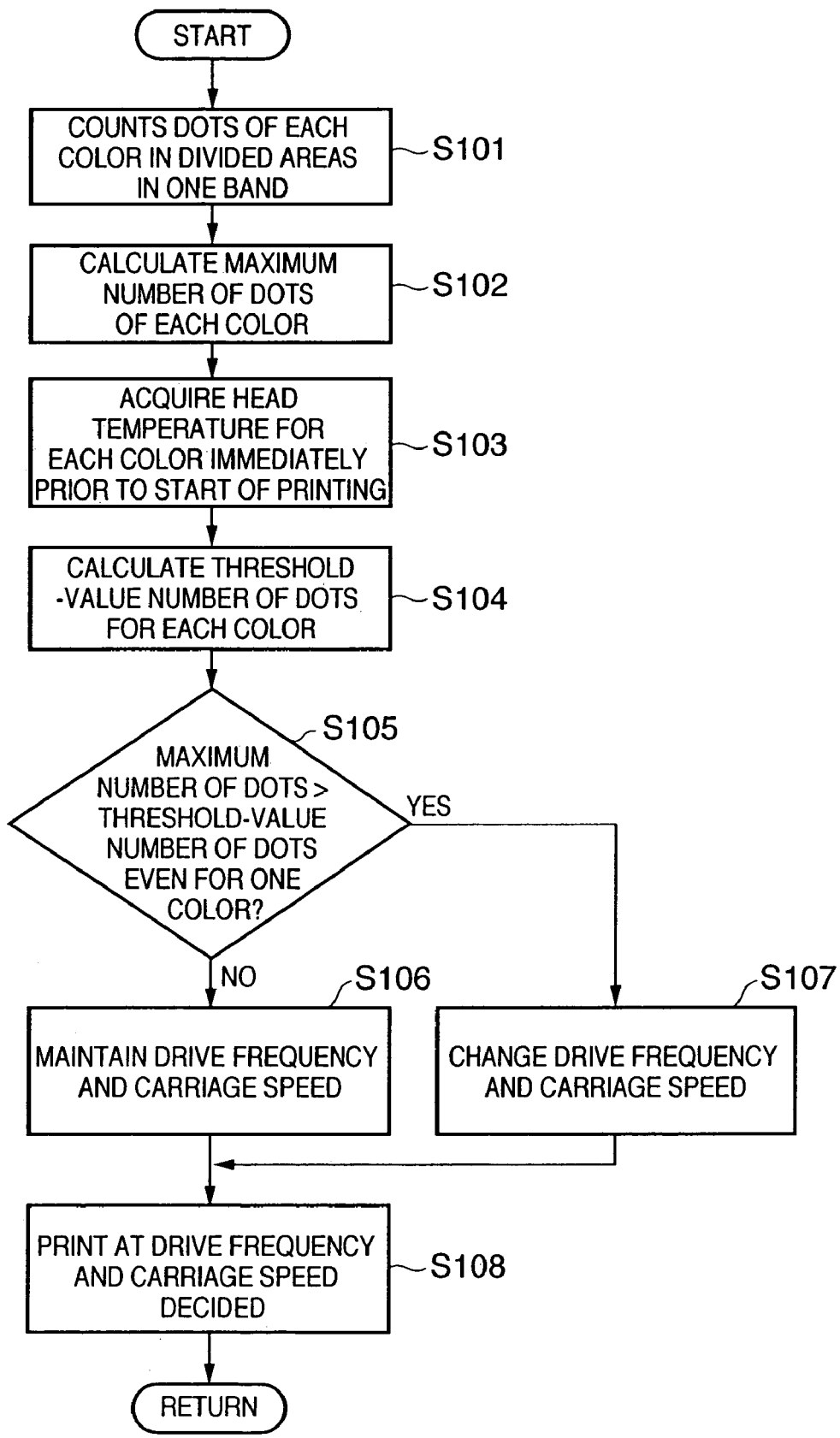
FIG. 5 is a flowchart corresponding to one example of processing for changing over drive frequency and carriage speed according to a first embodiment of the present invention.
Figure 13:
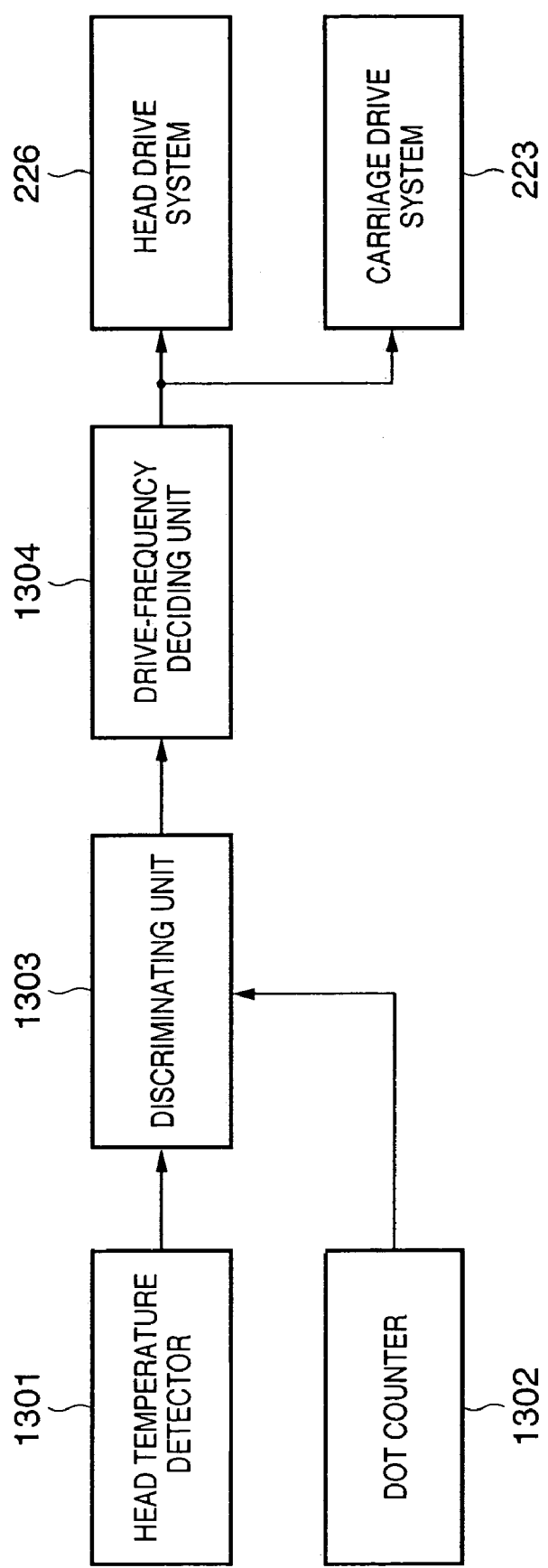
FIG. 13 is a diagram illustrating an example of the functional structure of an inkjet printer corresponding to the first embodiment of the present invention.

Next, reference will be had to FIGS. 5 and 13 to describe processing for changing over drive frequency and carriage speed in this embodiment. FIG. 5 is an overall flowchart for describing a first embodiment, and FIG. 13 is a block diagram illustrating the functional structure of the inkjet print apparatus 240 involved in the processing for changing over drive frequency and carriage speed in this embodiment.

In FIG. 13, a head temperature detector 1301 detects head temperature based upon an output from a temperature sensor, which is attached to the printhead 5, and outputs a detection signal. More specifically, the head temperature detector 1301 incorporates a temperature sensor for sensing temperature and an A/D converter circuit for converting an output analog signal from the temperature sensor to a digital signal. Thus the head temperature detector 1301 outputs a digital signal conforming to the temperature of the head.

The area on the printing medium is divided into a plurality of smaller areas in prescribed units, whereby divided areas are obtained. A dot counter 1302 counts the number of dots, which are formed in these divided areas, on a per-divided-area basis. Here an area (an area of 640×640 pixels) that is the result of demarcating, in prescribed units, one band corresponding to the width of the printhead is defined as a divided area and the dots of each color are counted in every divided area of this size. Here a pixel is defined as the pixel described above in FIG. 4, and each pixel is composed of a 2×2 matrix.

A discriminating unit 1303 compares a maximum number of dots and a threshold-value number of dots, described later with reference to FIG. 5, based upon the head temperature detected by the head temperature detector 1301 and the count value of every divided area registered by the dot counter.

A drive-frequency deciding unit 1304 decides the drive frequency and carriage speed of the printhead 5 based upon the result of discrimination by the discriminating unit 1303. The drive frequency decided is communicated to the head drive system 226 and the carriage speed is communicated to the carriage drive system 223 and printing control is performed.

Next, the processing executed by each block in FIG. 13 will be described with reference to the flowchart of FIG. 5. In this embodiment, it is assumed that the printing resolution of the printhead 5 in the scanning direction is 1200 dpi, that the carriage speed is 16.7 inch/sec, and that the drive frequency of the printhead 5 is 1200×16.7=20 KHz.

First, the dot counter 1302 counts dots in every divided area. The divided areas are obtained by demarcating an area, which corresponds to one band printed by the printhead 5, into areas in units of a prescribed monitor size (here 640×640 pixels). The counting of dots is performed independently for each color (S101). Since each divided area is a unit in which dots are counted, such a divided area shall also be referred to as a "dot counting area".

The numbers of counted dots are communicated to the discriminating unit 1303. A value corresponding to the maximum number of dots among the numbers of dots counted in respective ones of the divided areas in one band is calculated for each color by the discriminating unit 1303 (S102). Meanwhile, the head temperature of the printhead of each color is acquired by the head temperature detector 1301 (S103). The acquired head temperature information is communicated to the discriminating unit 1303, which calculates the threshold-value number of dots of each color from the head temperature of each color (S104). Furthermore, the discriminating unit 1303 compares the maximum number of dots corresponding to each color with the threshold-value number of dots corresponding to each color and determines whether the maximum number dots exceeds the threshold-value number of dots even for one color (S105).

If the threshold-value number of dots is exceeded, then flag information (e.g., a flag value of "1") indicative of this fact is communicated from the discriminating unit 1303 to the drive-frequency deciding unit 1304. The latter changes the drive frequency of the printhead 5 to 14.4 KHz and the carriage speed to 12 inch/sec. In other words, the drive-frequency deciding unit 1304 lowers the drive frequency and the carriage speed (S107). If the threshold-value number of dots is not exceeded, on the other hand, then flag information (e.g., a flag value of "0") indicative of this fact is communicated from the discriminating unit 1303 to the drive-frequency deciding unit 1304. The latter maintains a predetermined drive frequency and carriage speed (S106).

Printing is performed (S108) based upon the drive frequency and carriage speed decided by the drive-frequency deciding unit 1304.

By repeating the above-described processing scan by scan, printing can continue without lowering the drive frequency of the printhead 5 and the carriage speed, even if the printhead 5 attains a comparatively high temperature, so long as printing duty is such that discharge failure will not occur. Conversely, in case of a printing duty for which it is judged that there is a high likelihood that discharge failure will occur, printing is performed upon lowering the drive frequency and carriage speed, thereby making it possible to suppress detriment to an image caused by discharge failure. Accordingly, it is possible to minimize a decline in throughput while diminishing discharge failure ascribable to a rise in temperature at the time of continuous printing.

Figure 6:
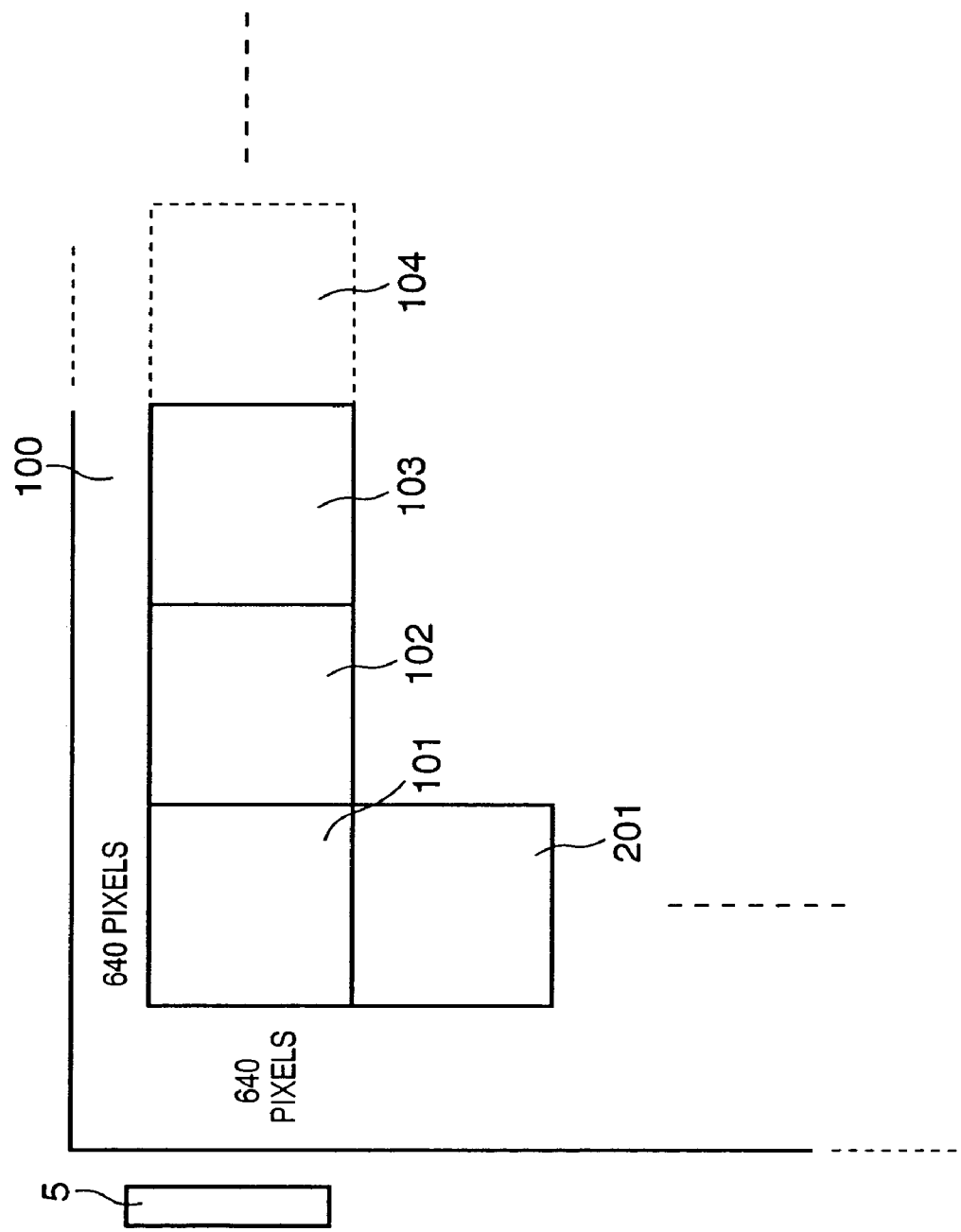
FIG. 6 is a diagram useful in describing a dot counting method for counting number of dots in one band of data printed by a printhead according to the first embodiment.

Next, reference will be had to FIG. 6 to describe an implementation for counting the dots in one band of data at S101 and S102 in FIG. 5. FIG. 6 is a diagram schematically illustrating a method of counting dots in one band of data printed by the printhead 5. An area on a recording medium 100 is divided into areas (640 pixels longitudinally) to be printed by one scan, i.e., into areas of single-band units. Furthermore, the area of one band is subdivided into sections (101, 102, 103, . . . ) in units of 640×640 pixels each. The areas thus subdivided serve as dot counting areas and dot counting is performed in each and every dot counting area. The width of one band in the secondary scan direction (the height of one band) agrees with the width of the printhead 5 in the direction in which the nozzles are arrayed.

The next band also is similarly demarcated (201, . . . ) in units of 640×640 pixels each and dots are counted in each dot counting area. Counting of dots is performed in each dot counting area in one band independently for each color before one scan of printing.

Figure 7:
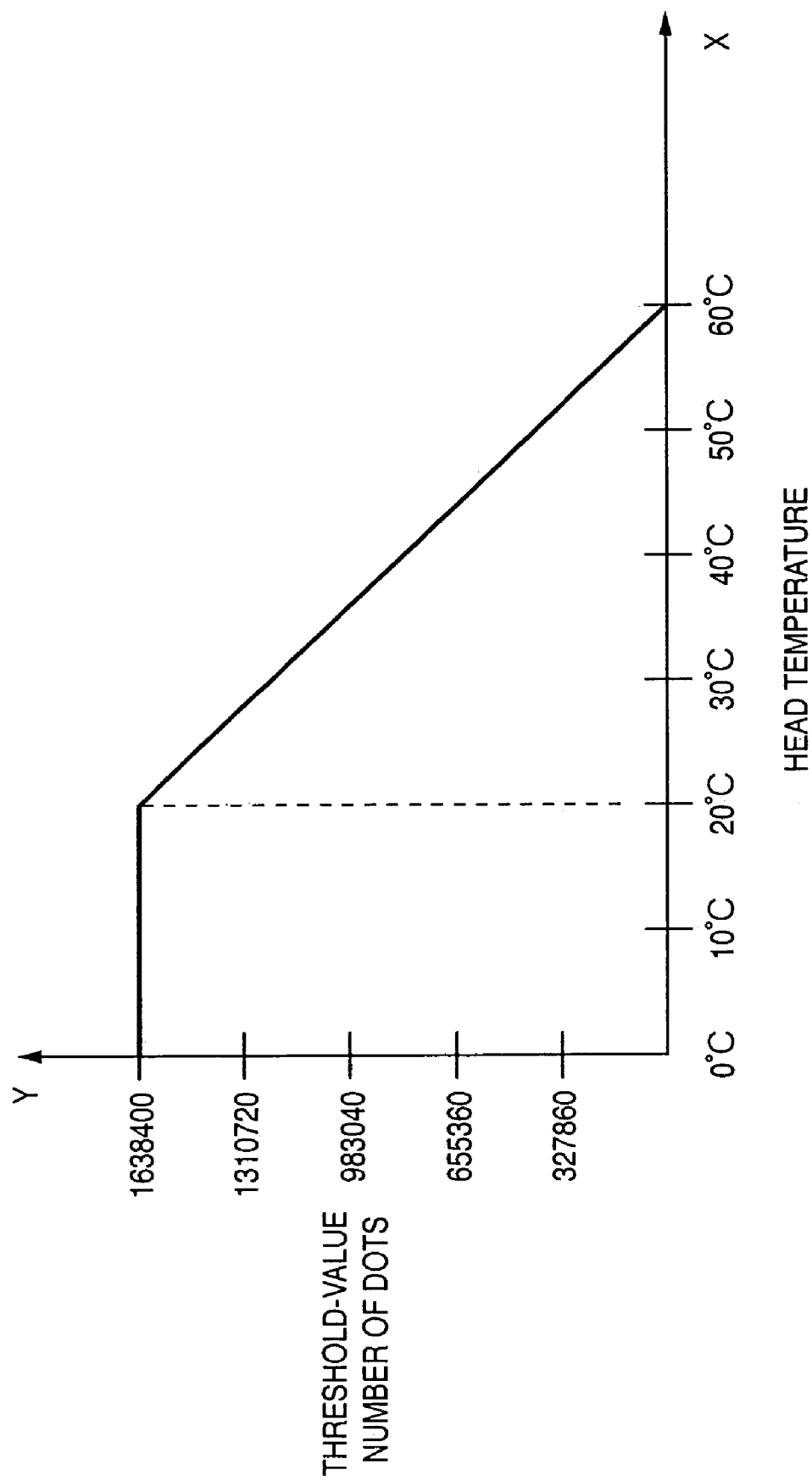
FIG. 7 is a graph illustrating the relationship between head temperature and a threshold-value number of dots according to the first embodiment.

Next, reference will be had to FIG. 7 to describe a method of calculating a threshold-value number of dots at S104 in FIG. 5. FIG. 7 is a graph illustrating a threshold-value number of dots set with respect to head temperature. A maximum number of dots of 1,638,400 counted in every dot counting area composed of 640×640 pixels up to a head temperature of 20° C. is adopted at the threshold-value number of dots. It should be noted that each pixel is constituted by a 2×2 matrix, as described above with reference to FIG. 4, and zero to four dots are disposed in each pixel. In other words, a maximum of four dots are disposed in each pixel. Accordingly, the maximum number of dots in a dot counting area composed of 640×640 pixels is 640×640×4=1,638,400.

In this embodiment, print data in an index format described in FIG. 4 is subjected to dot counting, and it is so arranged that zero to four dots can be printed with respect to index values 0000 to 0100. The threshold value is set by a linear function from head temperatures of 20° C. to 60° C.

$$Y = -40,960 \times X + 2,457,600$$

where Y represents the threshold-value number of dots and X the head temperature.

In this embodiment, the threshold-value number of dots is set by the linear function. However, it may be so arranged that the threshold-value number of dots can be set by a one-dimensional LUT or by calculation based upon a function.

Figure 8:
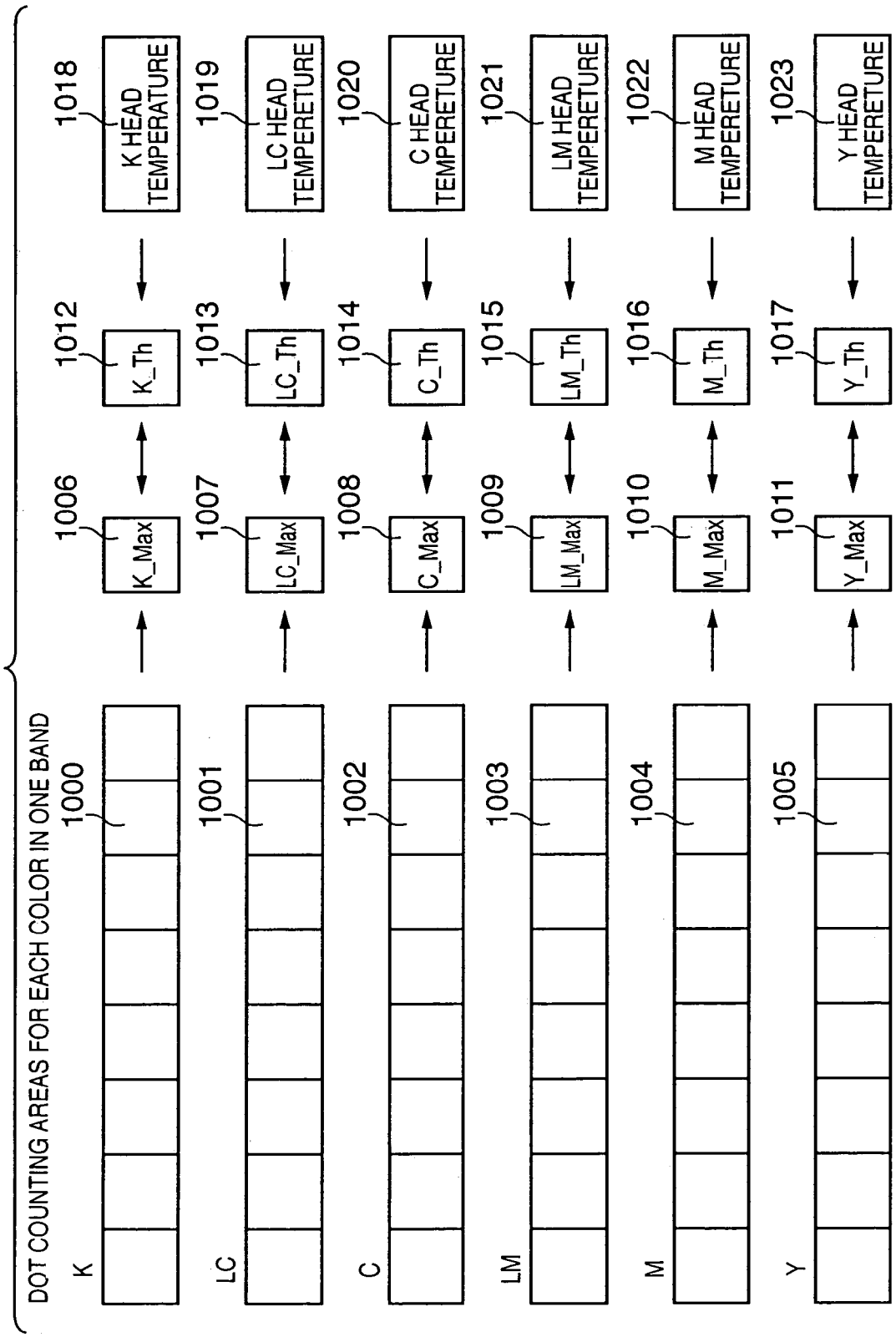
FIG. 8 is a diagram schematically illustrating a comparison between a threshold-value number of dots and dot-count value according to the first embodiment.

Next, reference will be had to FIG. 8 to describe the comparison between the threshold-value number of dots and the maximum value of the dot count at step S105 in FIG. 5. FIG. 8 is a diagram schematically illustrating a comparison between the threshold-value number of dots and dot-count value.

In FIG. 8, areas (1006 to 1011) are detected where the number of dots in each dot counting areas 1000 to 1005 in one band for each color is largest.

Here it will be assumed that the maximum number of dots for each of K, LC and C (1006 to 1008) is 1,400,000 and that the maximum number of dots for each of LM, M and Y (1009 to 1011) is 200,000. Head temperatures 1018 to 1023 for each color immediately prior to scanning are acquired. The threshold-value number of dots with respect to each of the head temperatures 1018 to 1023 is calculated from the above-mentioned function.

Here it will be assumed that 30° C. is the K head temperature 1018, LC head temperature 1019 and C head temperature 1020, and that 40° C. is the LM head temperature 1021, M head temperature 1022 and Y head temperature 1023. The threshold-value number of dots for K, LC and C (1012 to 1014) is −40960×30+2,457,600=1,228,800. On the other hand, the threshold-value number of dots for LM, M and Y (1015 to 1017) is −40960×40+2,457,600=819,200.

If the maximum number of dots for each color and the threshold-value number of dots are compared, it will be understood that the maximum number of dots of 1,400,000 exceeds the threshold-value number of dots 1,228,800 with regard to K, LC and C. On the other hand, the maximum number of dots of 200,000 does not exceed the threshold-value number of dots of 819,200 with regard to LM, M and Y. That is, since colors for which the threshold-value number of dots is exceeded exist, printing is performed upon lowering the drive frequency of the printhead 5 to 14.4 KHz.

Thus, as described above, the drive frequency and carriage speed of a printhead are changed over prior to the start of scanning based upon the head temperature and duty at which printing will be performed by the applicable scan. As a result, a decline in throughput can be minimized while discharge failure ascribable to a rise in temperature at the time of continuous printing is suppressed.

[Second Embodiment]

In the first embodiment, ink color is not discriminated when the threshold-value number of dots is calculated. In this embodiment, however, a case where the threshold-value number of dots with respect to head temperature is made different according to ink color will be described.

The discharge characteristic of each color ink discharged from the printhead 5 differs depending upon disparities in solvent composition and colorant. That is, there are cases where the limit on head temperature at which ink discharge can be performed normally differs.

Accordingly, in this embodiment, the object is to diminish further a decline in throughput by setting a threshold-value number of dots conforming to each ink color. It should be noted that it is assumed in this embodiment that processing similar to that of the first embodiment is executed with regard to the overall sequence, the dot counting method and the comparison between the threshold-value number of dots and maximum number of dots.

Figure 9:
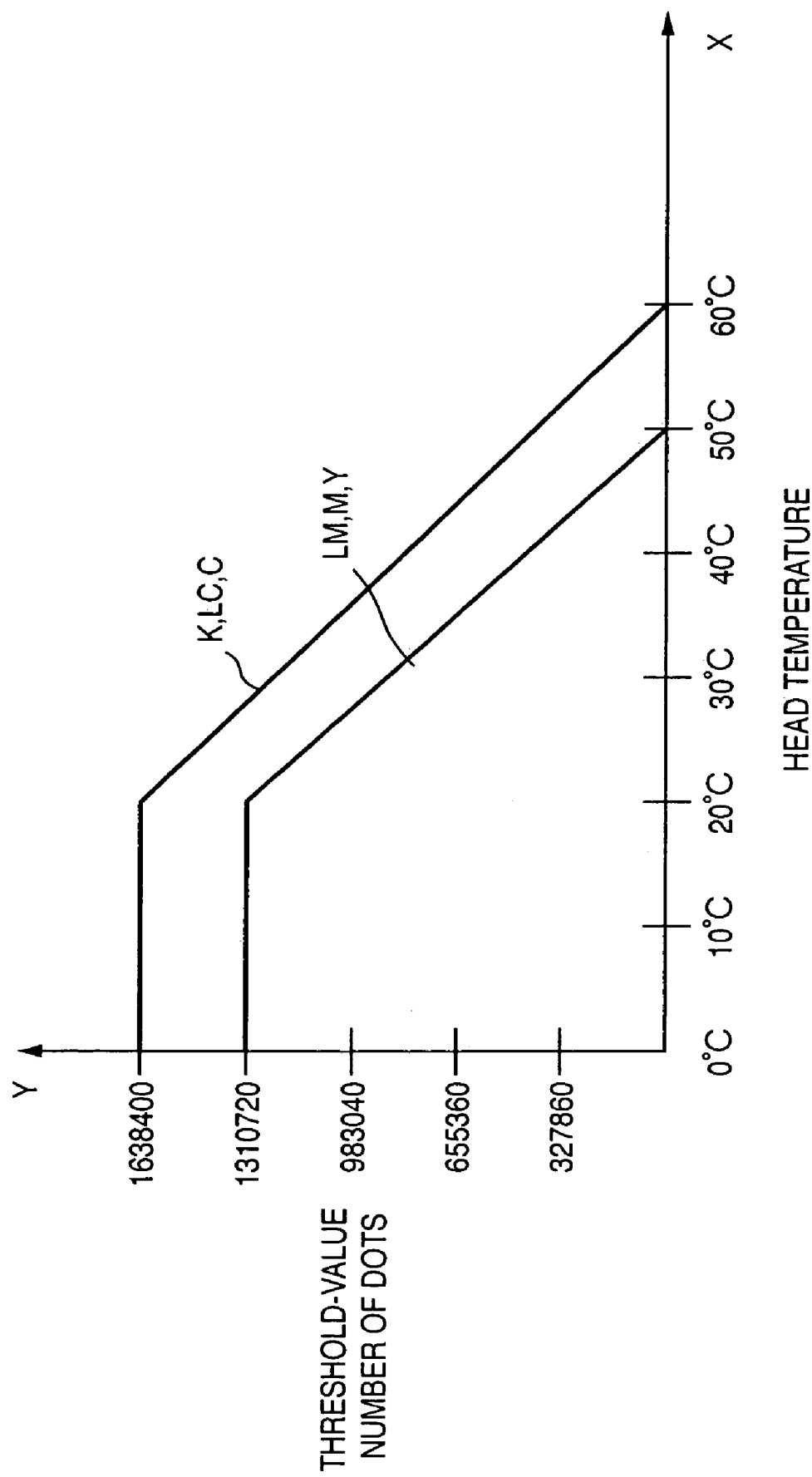
FIG. 9 is a graph illustrating the relationship between head temperature and a threshold-value number of dots of each color according to a second embodiment of the present invention.

FIG. 9 is a diagram illustrating the threshold-value number of dots of each color set with respect to head temperature in this embodiment. It will be assumed that discharge failure does not readily occur even at a comparatively high temperature with regard to K, LC and C, and that discharge failure does readily occur at a comparatively high temperature with regard to LM, M and Y. Accordingly, in a manner similar to that of the case illustrated in FIG. 7, up to a head temperature of 20° C., a maximum number of dots of 640×640×4 dots=1,638,400 is adopted as the threshold-value number of dots with regard to K, LC and C. From 20° C. to 60° C., the threshold value is set by a linear function.

$$Y=-40,960\times X+2,457,600$$

where Y represents the threshold-value number of dots and X the head temperature.

In this embodiment, the threshold-value number of dots is set by the linear function. However, it may be so arranged that the threshold-value number of dots can be set by a one-dimensional LUT or by calculation based upon a function.

With regard to LM, M and Y, on the other hand, 1,310,720 is adopted as the threshold-value number of dots up to a head temperature of 20° C. That is, for a image that involves a high duty, the drive frequency or carriage speed of the printhead 5 is lowered even at room temperature. From 20° C. to 50° C., the threshold value is set by a linear function.

$$Y=-43,691\times X+2,184,550$$

where Y represents the threshold-value number of dots and X the head temperature.

Thus, by setting a threshold-value number of dots that differs according to the ink color, circumstances in which discharge failure tends to occur are estimated and a decline in throughput can be suppressed efficiently while suppressing discharge failure before it occurs.

[Third Embodiment]

In the first and second embodiments, drive frequency, etc., is changed over depending upon whether or not a maximum value of a dot count in each dot counting area in a band exceeds a threshold-value number of dots. In this embodiment, however, there will be described a method of changing over drive frequency in a plurality of stages in accordance with the number of times the dot count in each dot counting area in a band exceeds a threshold-value number of dots. It is assumed in this embodiment that processing similar to that of the first embodiment is executed with regard to the overall sequence, the dot counting method and the setting of a threshold-value number of dots with respect to head temperature.

Figure 10:
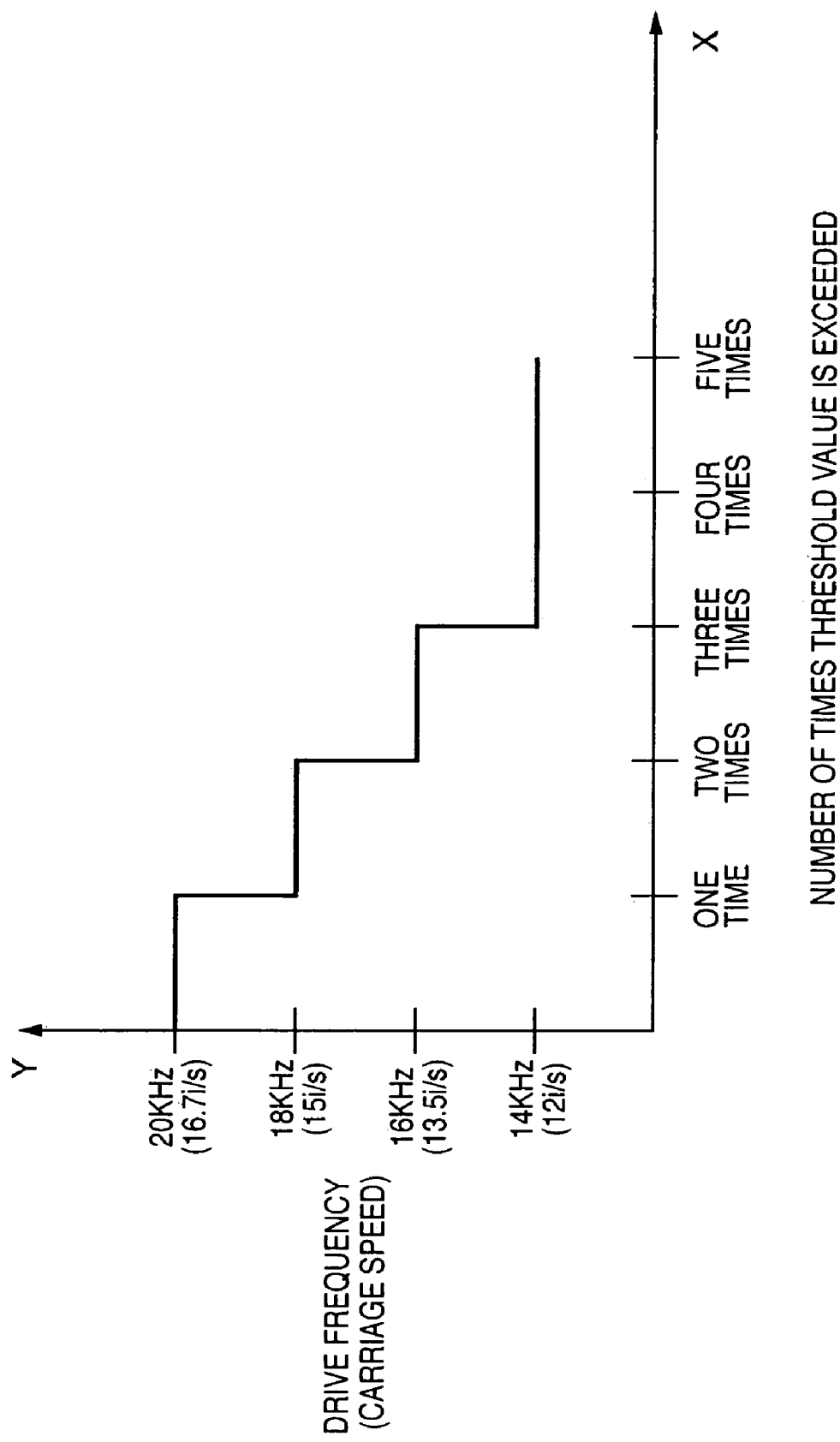
FIG. 10 is a graph illustrating the relationship between number of times a threshold-value number of dots has been exceeded and drive frequency and carriage speed according to a third embodiment of the present invention.

FIG. 10 is a diagram illustrating how drive frequency and carriage speed are set with respect to number of times a threshold-value number of dots is exceeded. In the first and second embodiments, the maximum number of dots and the threshold-value number of dots are compared and drive frequency is changed over in two stages. Consequently, the extent to which a high duty area is continuing cannot be discriminated.

In order to suppress discharge failure of the printhead 5, therefore, it is required that the threshold-value number of dots be set comparatively low. On the other hand, by setting the threshold-value number of dots comparatively high (e.g., 983,040), counting the number of times the threshold-value number of dots is exceeded and setting the drive frequency finely over a plurality of stages, a decline in throughput can be held to the minimum while discharge failure is suppressed.

Figure 11:
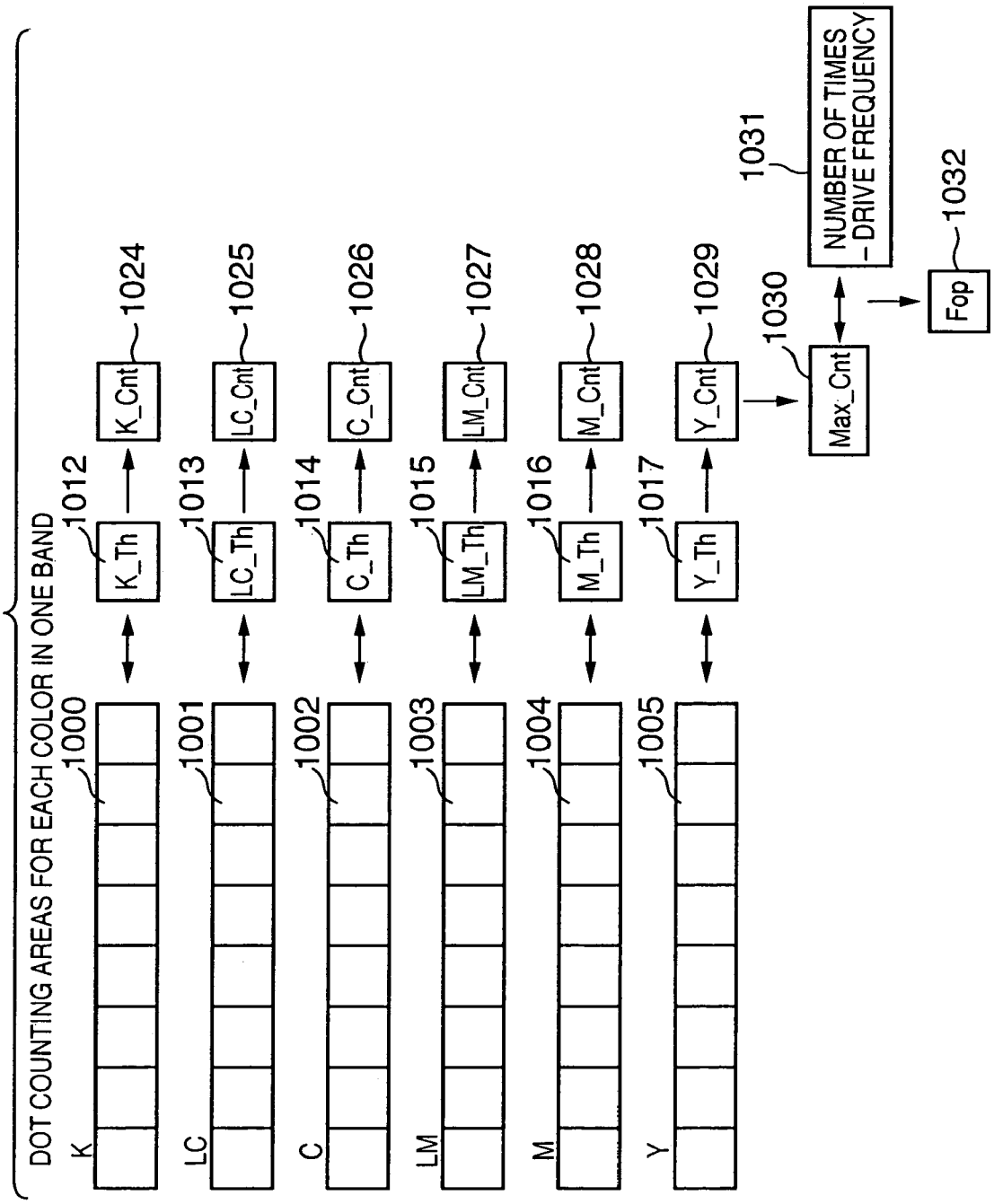
FIG. 11 is a diagram illustrating a comparison between dot count of each color and a threshold-value number of dots according to the third embodiment.

FIG. 11 is a diagram illustrating a comparison between a dot count and a threshold-value number of dots for each color. The number of dots in each dot counting area in one band and the threshold-value number of dots are compared with regard to each color and the number of times the threshold value is exceeded is counted. Printing is performed upon selecting the drive frequency from among any of the four values of 20 KHz, 18 KHz, 16 KHz and 14 KHz based upon the graph of FIG. 10 and the number of times regarding the color for which the threshold-value number of dots was exceeded the largest number of times.

By thus changing over the drive frequency and carriage speed based upon the number of times the threshold-value number of dots is exceeded, a decline in throughput can be held to the minimum.

[Fourth Embodiment]

The first to third embodiments have been described with regard to a case where the present invention is applied to a single pass of printing. In this embodiment, however, the present invention is applied to multipass printing. It is assumed in this embodiment that processing similar to that of the first through third embodiments is executed with regard to the overall sequence, the dot counting method and the comparison between a threshold-value number of dots and maximum number of dots. In this embodiment, it is assumed that printing (2-pass printing) is performed upon dividing one band two times.

Figure 12:
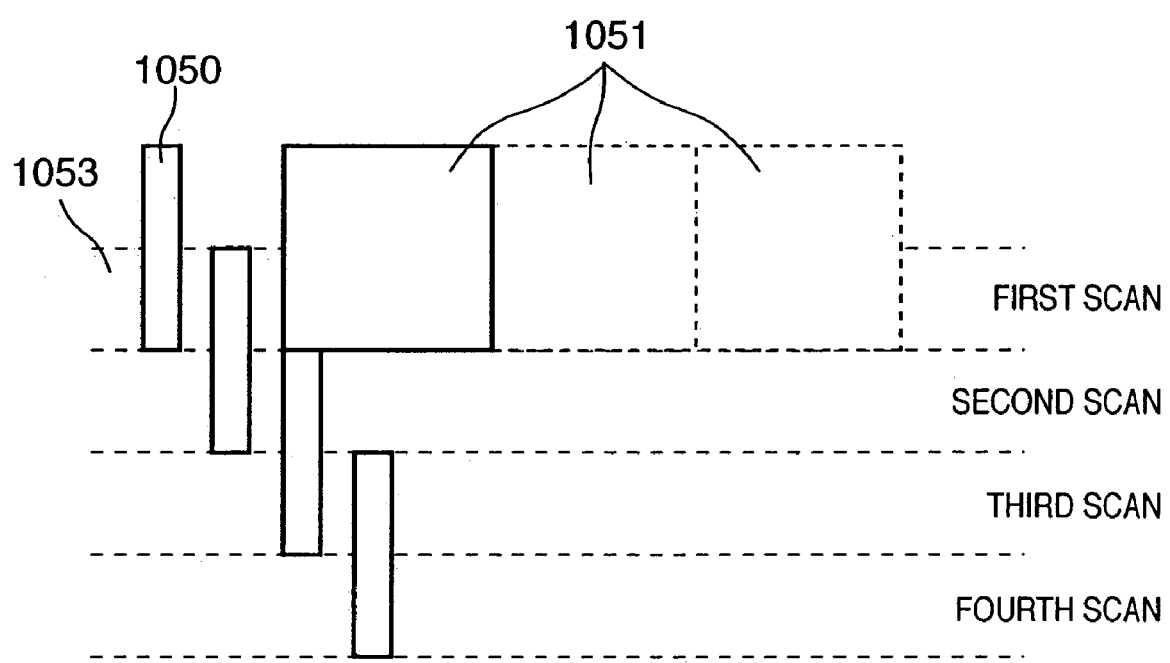
FIG. 12 is a diagram useful in describing a case where the present invention is applied to 2-pass printing according to a fourth embodiment of the present invention.

FIG. 12 is a diagram for describing a method of applying the present invention to 2-pass printing. An image is formed by two scans, namely first and second scans, in order for a printhead 1050 to print an image area 1053. At this time the print data of the first and second scans is printed upon applying mutually complimentary downsampling masks. Accordingly, the printing duty in which printing is performed by one scan is approximately half that of one pass.

Accordingly, a value obtained by multiplying the number of dots counted according to each area (dot counting area 1051) by a coefficient 0.5 is adopted as the number of dots with respect to the print data that prevails before application of the downsampling mask to the print data. If the threshold-value number of dots employs a value the same as that of 1-pass printing, discharge failure of the printhead can be suppressed.

Further, in a case where the data obtained after the application of the downsampling mask to the print data is subject to counting of dots, a comparison with the threshold-value number of dots may be performed without multiplication by a coefficient. It is desired that the approximate method be adopted in accordance with the structure of the printer.

In accordance with the present invention as set forth above, a decline in throughput can be held to the minimum while discharge failure ascribable to a rise in temperature at the time of continuous printing is reduced.

In this specification, "print" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans.

Also, a "printing medium" not only includes a paper sheet used in common printing apparatuses, but also broadly includes materials, such as cloth, a plastic film, a metal plate, glass, ceramics, wood, and leather, capable of accepting ink.

Furthermore, "ink" (to be also referred to as a "liquid" hereinafter) should be extensively interpreted similar to the definition of "print" described above. That is, "ink" includes a liquid which, when applied onto a printing medium, can form images, figures, patterns, and the like, can process the printing medium, and can process ink (e.g., can solidify or insolubilize a coloring agent contained in ink applied to the printing medium).

In the description of the above embodiment, a liquid droplet discharged from the printhead is ink, and the liquid stored in the ink tank is also ink. However, the liquid stored in the ink tank is not limited to ink. For example, the ink tank may store a processed liquid to be discharged onto a print medium so as to improve fixability and water repellency of a printed image or to improve its image quality.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification, or the arrangement as a single printhead obtained by forming printheads integrally can be used.

In addition, not only a cartridge type printhead in which an ink tank is integrally arranged on the printhead itself but also an exchangeable chip type printhead, as described in the above embodiment, which can be electrically connected to the apparatus main unit and can receive an ink from the apparatus main unit upon being mounted on the apparatus main unit can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

<Other Embodiments>

The present invention can be applied to a system comprising a plurality of devices (e.g., host computer, interface, reader, printer) or to an apparatus comprising a single device (e.g., copying machine, facsimile machine).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R, DVD+RW or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-056660 filed on Mar. 1, 2004, which is hereby incorporated by reference herein.

What is claimed is:

1. An inkjet print apparatus in which a printhead capable of printing utilizing ink of at least one color is mounted on a carriage and the carriage is caused to move across a printing medium to print an image on the printing medium comprising:
   a head temperature detector for detecting temperature of the printhead;
   a dot counter for counting number of dots, which are formed in divided areas, per each divided area obtained by dividing an area of the printing medium into a plurality of areas in prescribed units;
   a comparator for comparing a threshold value, which corresponds to printhead temperature that has been detected by said head temperature detector, and a count value representing the number of dots counted by said dot counter; and
   a decision unit for deciding, based upon result of the comparison performed by said comparator, a drive frequency for driving the printhead and a moving speed of the carriage;
   wherein printing of an image on the printing medium is performed at the drive frequency and moving speed decided by said decision unit.

2. The apparatus according to claim 1, wherein said comparator compares the threshold value and a maximum value among a plurality of count values obtained by counting dots in each divided area by said dot counter.

3. The apparatus according to claim 2, wherein said decision unit lowers the drive frequency and moving speed of the carriage in a case where the result of the comparison performed by said comparator is that the count value is greater than the threshold value.

4. The apparatus according to claim 2, wherein in a case where inks of a plurality of colors are used, the threshold value is set for every color of ink;
   said dot counter performs counting on a per-color basis; and
   in a case where the count value is greater than the threshold value with regard to any ink of the plurality of colors, said decision unit lowers the drive frequency and moving speed of the carriage with regard to printheads corresponding to the inks of all colors.

5. The apparatus according to claim 1, wherein from among a plurality of count values obtained by counting dots in each divided area by said dot counter, said comparator counts the number of those that exceed the threshold value; and
   said decision unit lowers the drive frequency and moving speed of the carriage in a case where the result of counting performed by said comparator exceeds a predetermined number.

6. The apparatus according to claim 1, wherein the divided areas are areas obtained by dividing an area corresponding to one band capable of being printed by a single move of the carriage into a plurality of areas in a direction in which the carriage is moved.

7. The apparatus according to claim 1, wherein the divided areas are areas obtained by dividing an entire printing area on the printing medium into a plurality of areas in both a direction in which the carriage is moved and a secondary scan direction orthogonal to the direction in which the carriage is moved.

8. A method of controlling an inkjet print apparatus in which a printhead capable of printing utilizing ink of at least one color is mounted on a carriage and the carriage is caused to move across a printing medium to print an image on the printing medium comprising:
   a head temperature detecting step of detecting temperature of the printhead;

a dot counting step of counting number of dots, which are formed in divided areas, per each divided area obtained by dividing an area of the printing medium into a plurality of areas in prescribed units;

a comparing step of comparing a threshold value, which corresponds to printhead temperature that has been detected at said head temperature detecting step, and a count value representing the number of dots counted at said dot counting step; and a decision step of deciding, based upon result of the comparison performed at said comparing step, a drive frequency for driving the printhead and a moving speed of the carriage;

wherein printing of an image on the printing medium is performed at the drive frequency and moving speed decided at said decision step.

9. The method according to claim 8, wherein said comparing step compares the threshold value and a maximum value among a plurality of count values obtained by counting dots in each divided area at said dot counting step.

10. The method according to claim 9, wherein said decision step lowers the drive frequency and moving speed of the carriage in a case where the result of the comparison performed at said comparing step is that the count value is greater than the threshold value.

11. A computer program for causing a computer to implement a control method for controlling an inkjet print apparatus in which an image is printed on a printing medium using a printhead, said method comprising:

a head temperature detecting step of detecting temperature of the printhead;

a dot counting step of counting number of dots, which are formed in divided areas, per each divided area obtained by dividing an area of the printing medium into a plurality of areas in prescribed units;

a comparing step of comparing a threshold value, which corresponds to printhead temperature that has been detected at said head temperature detecting step, and a count value representing the number of dots counted at said dot counting step; and a decision step of deciding, based upon result of the comparison performed at said comparing step, a drive frequency for driving the printhead and a moving speed of the carriage.

* * * * *